April 22, 1930.  E. C. MILLER  1,755,263
MACHINE FOR MAKING ANNULAR PIECES OF CANDY
Filed Oct. 30, 1928  5 Sheets-Sheet 1
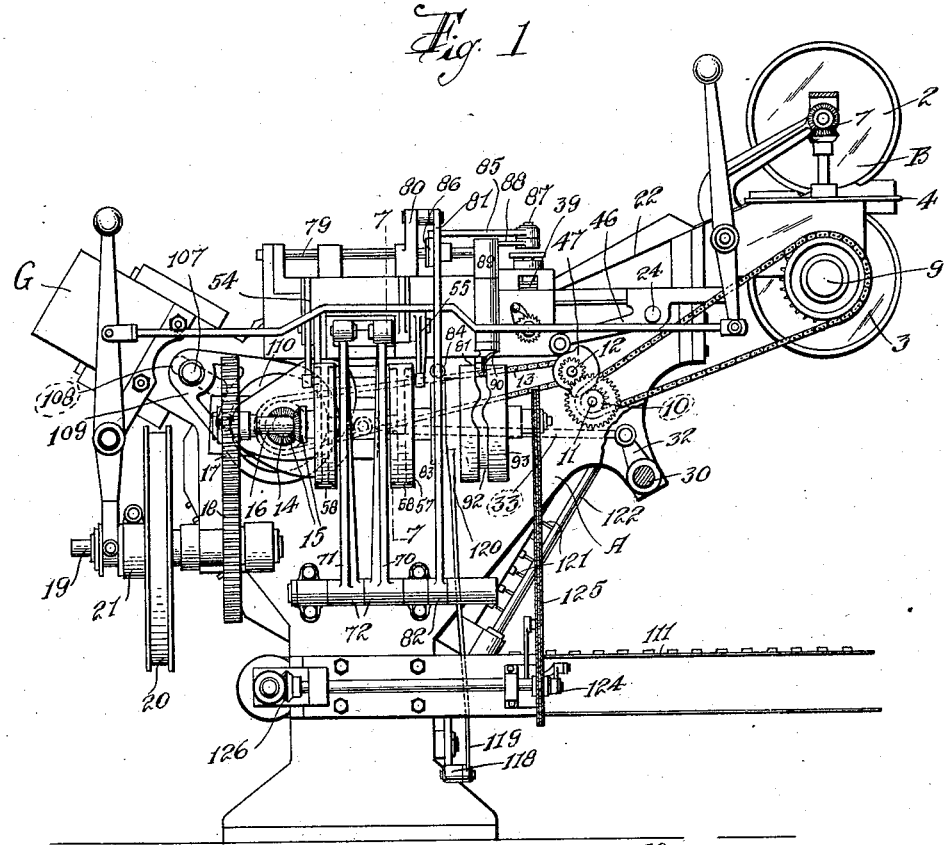
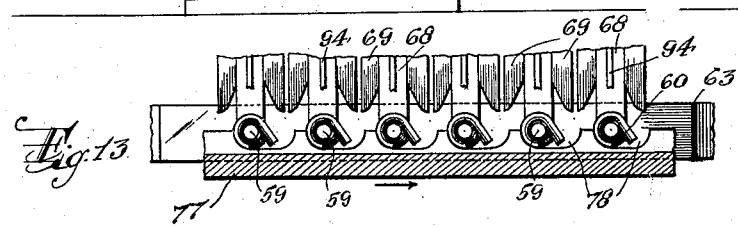
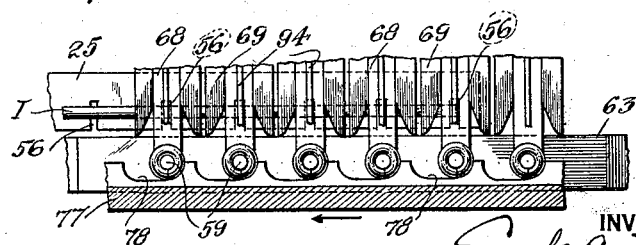

April 22, 1930.    E. C. MILLER    1,755,263
MACHINE FOR MAKING ANNULAR PIECES OF CANDY
Filed Oct. 30, 1928    5 Sheets-Sheet 2
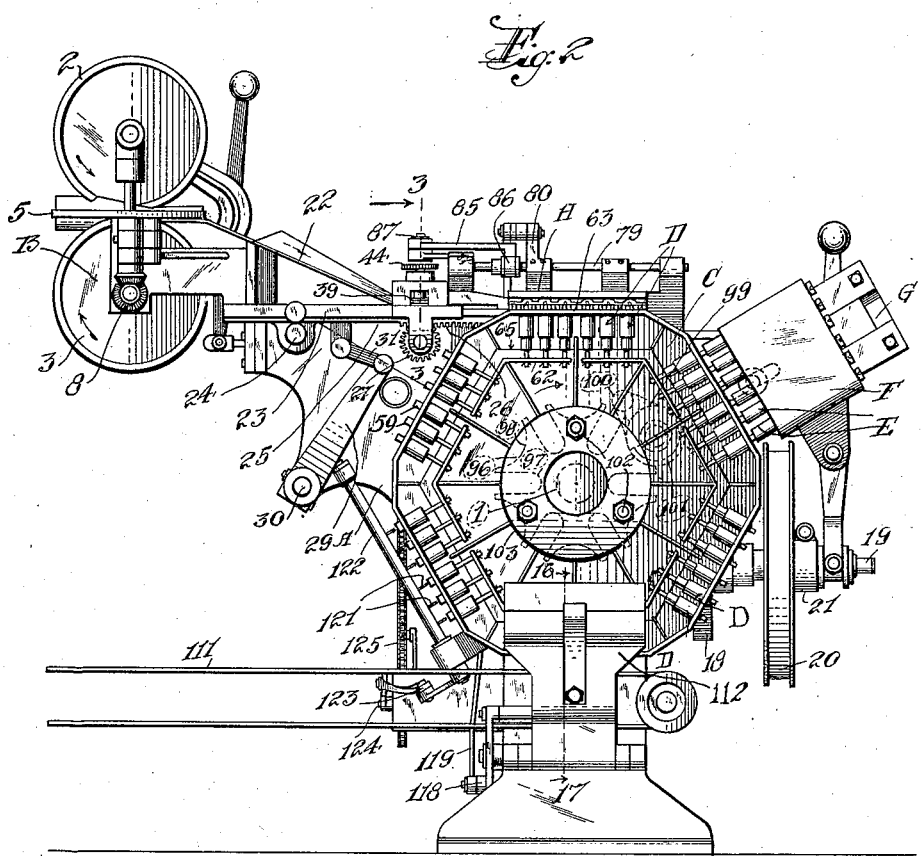
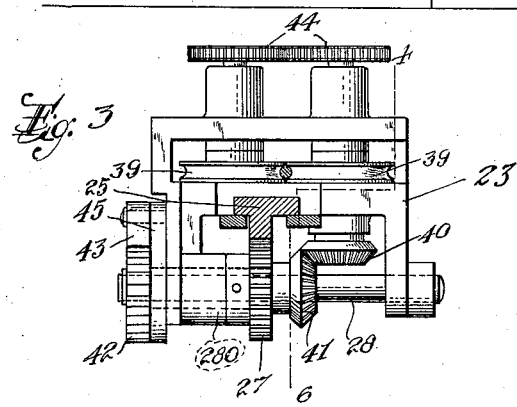

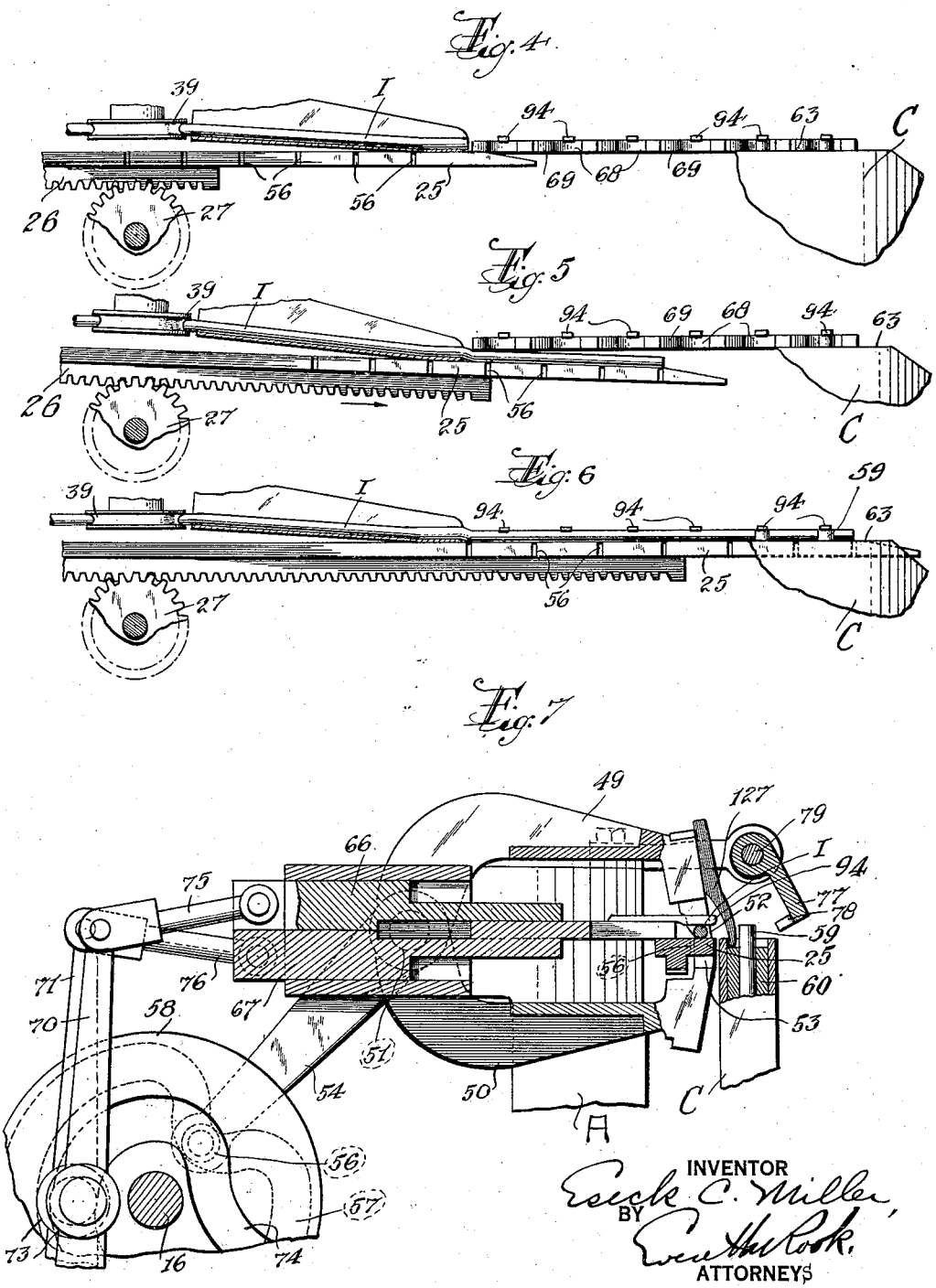

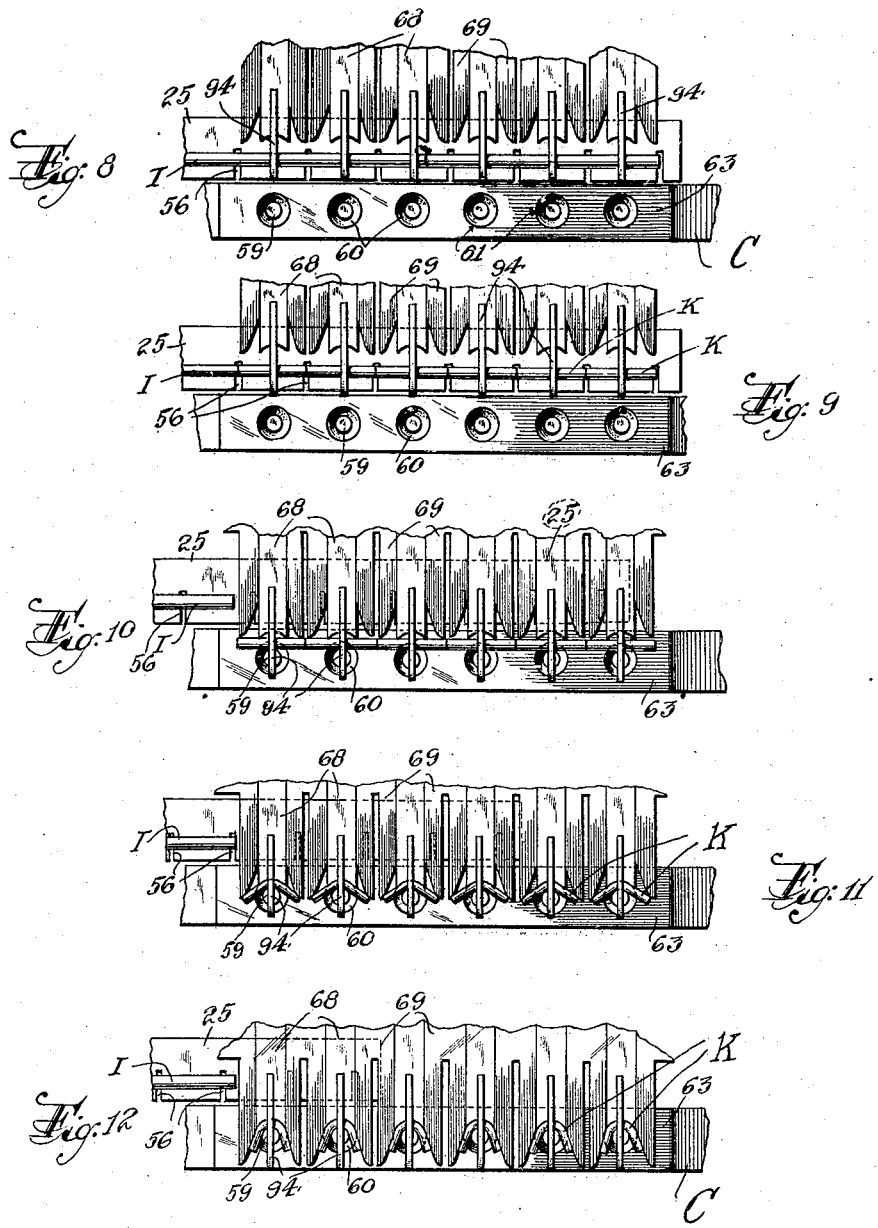

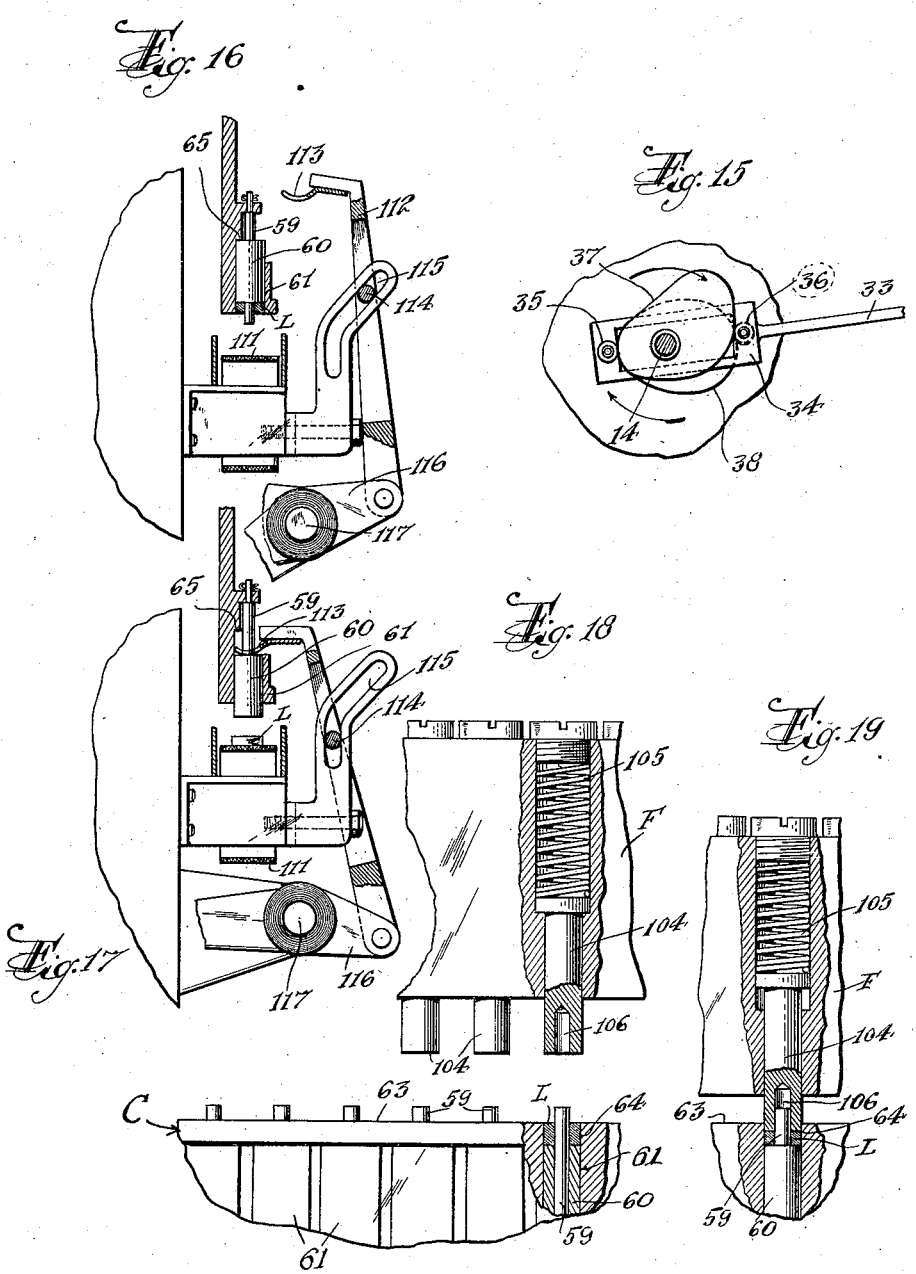

Patented Apr. 22, 1930

1,755,263

UNITED STATES PATENT OFFICE

ESECK C. MILLER, OF NEWARK, NEW JERSEY

MACHINE FOR MAKING ANNULAR PIECES OF CANDY

Application filed October 30, 1928. Serial No. 315,986.

This invention relates in general to candy-making machines, and more particularly to a machine for making annular or ring-like pieces of candy, such as shown and described in my Patent No. 1,726,113, filed December 15, 1927. The invention is especially intended for use in making candy from material which during manufacture is tacky, taffy-like or pasty in consistency and hardens after a period of time. It has been found to be practically impossible to punch annular pieces of candy from such material because the material strings and adheres to the edges of the dies, so that not only are the dies short-lived, but the pieces of candy have rough edges.

One object of this invention is to provide a machine of this character embodying novel and improved features of construction whereby the machine is capable of a larger output of candy pieces than is possible with other known machines for producing candy pieces of the character described.

Another object is to provide such a machine including novel and improved means for feeding to the dies the material of which the candy pieces are to be formed.

A further object is to provide novel and improved means for preliminarily shaping the material into annular form and depositing it into the dies.

Other objects are to provide such a machine comprising a support having a plurality of series of die members thereon, and a single series of die members to cooperate successively with each of said plurality of series of die members to compress the material into annular pieces, said support and said single series of die members being relatively movable to cause successive cooperation of said plurality of series of die members with said single series, and to make said support rotatable on a horizontal axis with the plurality of series of die members on its periphery and movable step-by-step with respect to said single series.

Further objects are to provide means for supplying at one time a predetermined quantity of material sufficient for all dies in one of said plurality of series, dividing said material into pieces of the required size and depositing simultaneously all of said pieces into the respective die members; to provide novel and improved construction and combination of parts for simultaneously preliminarily shaping all of said pieces into annular form and at the same time depositing all of said annular pieces into the respective dies, and to obtain other advantages and results as will be brought out by the following description.

Referring to the accompanying drawings, in which the same reference characters designate corresponding and like parts, Figure 1 is a rear elevation of a machine embodying my invention.

Figure 2 is a front elevation thereof.

Figure 3 is an enlarged transverse vertical sectional view taken on the line 3—3 of Figure 2.

Figures 4, 5, and 6 are fragmentary vertical longitudinal sectional views taken on the line 4—6 of Figure 3, and illustrating the material feeding means in its various positions assumed during the feeding operation.

Figure 7 is an enlarged transverse vertical sectional view taken on the line 7—7 of Figure 1, showing the material dividing means and means for shaping the pieces of material into annular form and depositing them into the dies.

Figures 8, 9, 10, 11, 12, 13 and 14 are fragmentary plan views of the shaping and depositing means illustrating the successive positions thereof assumed during the shaping and depositing operation.

Figure 15 is a fragmentary sectional view showing the cam mechanism actuating the feeding means.

Figures 16 and 17 are fragmentary transverse sectional views on the line 16—17 of Figure 2, showing the mechanism for forcibly ejecting the annular pieces of candy from the dies and Figures 18 and 19 are enlarged sectional elevations of the cooperating dies for compressing the material, Figure 18 showing the dies in disengaged relation and Figure 19 illustrating the dies in material compressing relation.

Specifically describing the illustrated embodiment of the invention, the reference character A designates the frame of the machine at one end of which is arranged feeding means generally designated B for supplying material from which the candy pieces are to be formed. Intermediate the length of the frame and on the front thereof is journalled on a horizontal shaft 1, a die support or wheel C which is shown as approximately hexagonal in shape and provided on each of its faces with a series of die members D with all of which series cooperates successively a single series of complemental die members E which are mounted on a reciprocating head F slidable in guides G at the end of the machine opposite the feeding means B. At one side of the die wheel C is arranged a material dividing, shaping and depositing mechanism H which is designed to divide the material supplied by the feeding means B into a plurality of pieces, shape the pieces into substantially annular form and deposit them simultaneously one in each of the die members D of one series. In general operation of the machine, the die wheel C is rotated in the direction of the arrow in Figure 2 with a step by step motion so as to bring the respective series D of die members successively into cooperative relation with the shaping and depositing mechanism H and the pressure die members E, the feeding means B supplying a predetermined quantity of material for each series D of die members.

The feeding mechanism B is shown as comprising four feeding wheels 2, 3, 4 and 5 which are arranged in pairs at right angles to each other so as to form a passage between the adjacent points of their peripheries to receive a lump of material to be operated upon, for example plastic candy composition. These wheels are rotated in the direction of the arrows by beveled gearing 7 and 8 which is driven from a shaft 9 by chain and sprocket gearing 10 on a stub shaft 12 driven by chain and sprocket gearing 13 from a countershaft 14 driven by beveled gearing 15 from a main countershaft 16 which is in turn driven through gears 17 and 18 from a main drive shaft 19 carrying a belt pulley 20 by which the shaft may be connected to a suitable source of power. Suitable clutch mechanism 21 is provided for connecting and disconnecting the shaft 19 from the pulley 20. The material is formed by the wheels 2, 3, 4 and 5 into a strip or rod-like form which is fed along a chute 22 to a carrier which conveys the material to the dividing and shaping mechanism H. This carrier comprises a frame 23 pivotally mounted as at 24 on the main frame A to oscillate about a horizontal axis. Reciprocably mounted in said frame is a carrier plate 25 on the bottom of which is a rack with which meshes a pinion 27 fast to a sleeve 280 rotatable on a shaft 28. The carrier plate 25 is reciprocated by a lever 29 fast at one end upon a shaft 30 and connected at its other end by a link 31 to the carrier plate. The shaft 30 is provided with a crank arm 32 which is connected by a rod 33 to a driving frame 34 (see Figure 15) at opposite ends of which and on opposite sides are two rollers 35 and 36 which bear upon the respective cams 37 and 38 fast upon the counter shaft 14. The frame 34 embraces the shaft 14, and obviously rotation of the cams 37 and 38 by the shaft 14 will cause movement of the rod 33 alternately in opposite directions so as to reciprocate the carrier plate 25.

The reciprocation of the carrier plate drives forming wheels 39 which receive the material between them from the chute 22 and shape it into the desired cross-sectional shape before it is deposited on the carrier plate 25. To this end the wheels 39 are journalled on vertical shafts in the frame 23 and one thereof is driven by beveled gears 40 and 41 the latter of which is fast to the shaft 28. A ratchet 42 is fast to the shaft 28 and cooperates with a pawl 43 pivoted on an arm 45 fast on the sleeve 280. The two wheels 39 are caused to rotate together by a pair of pinions 44. With this construction it will be observed that upon each movement of the carrier plate 25 in a direction away from the chute 22, the wheels 39 will be rotated to deposit the material on the carrier plate 25, while upon the reverse movement of the carrier plate the pawl 43 rides over the ratchet 42 so as to cause no rotation of the shaft 28 and consequently no movement of the wheels 39. It will be understood that the ratio of the gearing is such that the speed of movement of the carrier plate 25 is the same as the speed of travel of the material issued from between the wheels 39. The carrier plate is moved in the direction away from the wheels 39 a sufficient distance to carry a strip of material I into proper relation to the dividing, shaping and depositing mechanism as clearly shown in Figures 4 to 7, inclusive. The frame 23 is oscillated about its pivot 24 for a purpose to be hereinafter described by means of an arm 46 on the frame which follows a cam 47 fast on the shaft 12 and constantly rotated thereby.

The dividing, shaping and depositing mechanaism H includes a pair of cooperating shearing members 49 and 50 which are pivotally mounted upon a common axis 51 with their cutting blades 52 and 53 disposed at opposite sides of the carrier plate 25 (see Figure 7). The carrier plate is provided with a plurality of transverse notches 56 through which the blades 52 and 53 may pass in dividing the strip I of material into a number of pieces corresponding to the number of die members in each series D. These shearing members are actuated toward and from each other by the respective arms 54 and 55 which carry follower rollers 56 arranged in cam grooves 57 in the faces of discs 58 fast on the counter-shaft 16, and once during each revolution of the shaft 16, the blades 52 and 53 are brought together to divide the strip I of material into several pieces corresponding in number to the die members D as shown in Figures 7 and 9.

As illustrated each series of die members on the wheel C consists of six die members each of which comprises a central post or pin 59 upon which is slidable a sleeve 60 within a casing 61. The pins 59 are secured to the respective flanges 62 and project centrally through the respective casings 61 beyond the corresponding flat side 63 of the wheel C through which open the die casings 61. The sleeves 62 are normally so located that their outer ends are below the flat side 63 so as to form a die cavity 64 the bottom of which is formed by the outer end of the sleeve 60 (see Figures 16 to 19, inclusive); and the sleeves 60 are held in this position by abutment shoulders 65 on the face of the wheel C. By action of gravity the sleeves 60 may slide outwardly of the die casings 61 so that their outer ends are substantially flush with the outer ends of the respective pins 59, as shown in Figure 17. The die members D are charged with the material when they reach the top side of the wheel C, that is, when the flat surface 63 is in a substantially horizontal position, and the carrier plate 25 conveys the strip of material into the plane of the flat side 63 and at one side thereof as shown in Figure 7 of the drawing.

At the side of the material on the carrier plate opposite the wheel C is arranged a shaping and depositing mechanism for shaping and depositing the pieces of material into the respective die members D. This mechanism is shown as comprising two plates 66 and 67 mounted to slide in a horizontal plane in the frame A and relative to each other. The corresponding edges of the plates are formed with the respective cooperating shaping fingers 68 and 69, the fingers 68 of one plate being arranged in alternate relation to the fingers 69 of the other plate and movable in substantially the same plane over the carrier plate 25 and the flat surface 63 of the die wheel. The two plates 66 and 67 are reciprocated by the respective levers 70 and 71 pivotally mounted at one end as at 72 and carrying rollers 73 intermediate their ends which follow grooves 74 in the faces of the discs 58, the other ends of the levers 70, 71 being connected by the links 75 and 76 to the respective plates 66 and 67.

In the operation of the shaping and depositing apparatus, the carrier plate 25 brings the strip of material I into a position between the shaping fingers 68 and 69 and the die members D as shown in Figure 8 of the drawings. The shearing members 49 are then operated to divide the strip I into a plurality of pieces K, each piece containing the proper amount of material for the respective die member D as shown in Figure 9. The plates 66 and 67 are then moved by the respective levers 70 and 71 to push the pieces of material from the carrier plate 25 onto the flat surface 63 of the die member as shown in Figure 10. The shaping fingers 68 have their forward ends transversely curved substantially concentric with the pins 59 of the die members and are brought into such position as to partially curl the respective pieces of material around the pins as shown in Figure 11. Thereupon the shaping fingers 69 are moved relatively to the fingers 68 so as to further curl the pieces of material around the respective pins into substantially U-shape. The fingers 69 are then retracted as shown in Figure 13 and thereafter one end of each piece of material is further curled around its pin by movement of a curling member 77 in one direction, movement of which in the other direction then curls the other ends of the pieces of material as shown in Figure 14. The member 77 comprises a bar-like structure having a plurality of notches 78 in its edge, one for each die member D, the ends of said notches being curved concentrically with the casings 61 of the die members. This curling member is mounted on a shaft 79 for pivotal movement toward and from the die members and for reciprocating movement in a plane parallel to the flat surface 63 of the die wheel. For pivotally moving the member 77 the shaft 79 has a crank arm 80 to which is connected one end of a link 81 the other end of which is pivotally mounted as at 82. The intermediate portion of the line 81 bears against a cam 83 which the link is caused to follow by a tension spring 84. Reciprocating movement of the curling member is produced by a link 85 having a suitable collar connection 86 with the shaft 79 and pivotally connected at 87 to the arm 88 of a member 89 journalled to rotate on a vertical axis on the frame A and having at its lower end another arm 90 which carries a roller 91 arranged in a cam groove 92 in a disc 93 mounted on counter-shaft 16. It will be understood that the member 77 must normally be out of the way so as not to obstruct rotation of the die wheel C and the curling member is moved into the position shown in Figures 13 and 14 only during the shaping operation on the pieces of material. After the curling member has been moved into the position of Figure 13 it is reciprocated to curl the ends of the pieces of material as shown, after which it is returned to the position shown in Figure 7. The shaping fingers 68 preferably carry projections 94 to overlie the respective pieces of material and prevent them from being raised off the flat surface 63 during the shaping operation.

To obtain speed of operation the parts are so arranged that the material for one series of dies may be fed to the machine while the material for the previous set of dies is being shaped and deposited; and to this end the frame 23 of the carrier mechanism is mounted to oscillate about a horizontal axis. This permits the new strip of material to be fed beneath the shaping fingers 68 and 69 while they are operating on the previous supply of material, the sequence of operations being shown in Figures 4 to 6 inclusive. The cam 47 causes the frame 23 to tilt and drop the forward end of the carrier plate beneath the fingers 68, 69 as shown in Figure 5 of the drawings until said fingers have been retracted to their normal positions shown in Figure 7, after which the cam raises the frame to bring the new strip of material into the plane of the fingers and the plane of the flat surface 63 of the die wheel, as shown in Figure 6.

The die wheel is rotated with a step by step motion in any suitable manner but preferably by a Geneva movement of known construction which comprises a Geneva wheel 96 having radial slots 97 therein between which are arcuate recesses 98. A driving member 99 mounted on the shaft 14 cooperates with the Geneva wheel 96, said driving member having a pin 100 to enter the slots 97 and rotate the Geneva wheel. Movement of the Geneva wheel is stopped by an arcuate projection 101 on the driving member which cooperates with the arcuate recesses 98. The Geneva wheel is fast on the shaft 1 and bolts 102 are secured in the Geneva wheel, pass through the die wheel C and are connected to a cap plate 103, whereby the die wheel is removably mounted on the shaft 1. The Geneva drive is of known construction and operation, the result of it in the present case being to rotate the die wheel C with a step by step motion so that at each stop one of the flat sides 63 is disposed in the position shown in Figure 2 to receive material from the carrier plate 25.

After the material has been deposited in the die members D, and upon the next step of movement of the die wheel C, the die members are brought into cooperating relation with the pressure die members E. These die members each comprises a plunger 104 slidably mounted in the head F against the influence of a compression spring 105, the outer end of the plunger having an opening 106 to receive the end of the corresponding pin or post 59 of the die member D. The plunger 104 is adapted to enter with a nice fit into one of the die casings 61, as clearly shown in Figure 19, so as to compress the annular piece of material L therein. For reciprocating the pressure dies E into cooperating relation with the die members D, the head F which is slidable in the guide G is connected by a pin 107 movable in a slot 108 in the guide G to an eccentric strap 109 arranged around an eccentric 110 on the counter-shaft 14 (see Figure 1). This eccentric and the speed of the shaft 14 are so related to the other parts of the machine that the plungers 104 are brought into material compressing relation with the die members D (see Figure 19) once upon each step of rotation of the die wheel. When the pieces of candy have been thus compressed and finished, they are brought by successive steps of rotation of the die wheel 3 to the underside of the wheel, where they are discharged upon any suitable mechanism such as a conveyor belt 111. This discharge may be under ideal conditions by action of gravity on the sleeves 60 which would normally force the pieces of material L out of the die casings 61 onto the conveyor as shown in Figure 17. However, it is desirable to provide means for forcibly ejecting the pieces of material and this means may consist of an ejector comprising a link 112 having at one end a plurality of lateral spring fingers 113 one to engage the underside of each sleeve 60. The link has a pin 114 which rides in a curved slot 115 as the link is moved vertically by a crank 116 on a shaft 117 oscillated by another arm 118 connected to one end of a link 119 the other end of which carries an eccentric strap 120 mounted on a cam on the counter-shaft 16. With this construction it will be observed that the normal position of the ejector 112 is shown in Figure 16 and that as each series of die members D reaches the discharge position the ejector is brought into engagement with the sleeves 60 which are forcibly pushed from the die casings and eject the pieces L of the material as shown in Figure 17.

Should the pieces of material stick to the faces of the sleeve 60, I may provide a plurality of raking fingers 121 on an oscillatory shaft 122 oscillation of which causes the fingers 121 to rake across the faces of the sleeves and dislodge the pieces of material which may have stuck thereon. The shaft 122 may be oscillated in any suitable manner as by means of suitable linkage 123 between one end of the shaft 122 and a shaft 124 which is driven by a chain and sprocket gearing 125 from the counter-shaft 16. This shaft 124 also drives the conveyor belt 111 by beveled gearing 126.

Should the sleeves 60 fail by action of gravity to return to their normal positions in the die casings 61 I may provide a plurality of pushing fingers 127 on the upper shearing member 47 so that as the shear members are operated the pushing fingers 127 are brought into contact with the outer ends of the sleeves 60 which are thereby forcibly pushed to their normal positions against the abutment shoulders 65.

It will be understood that while the construction herein shown and described is the now preferred means of carrying out my invention, the details of the machine may be modified and changed by those skilled in the art without departing from the spirit or scope of the invention, and I do not desire to be understood as limiting myself to the specific details of construction shown.

Having thus described the invention, what I claim is:

1. A machine of the character described, comprising a plurality of annular die cavities disposed in a row, means for feeding a strip of material to be operated upon alongside of said row of die cavities, means for dividing said strip of material into pieces, and means for simultaneously shaping each of said pieces into annular form and depositing it into one of said die cavities.

2. A machine of the character described, comprising a support having a flat surface and a plurality of die cavities therein, means for feeding and temporarily holding a strip of material to be operated upon in the plane of said flat surface, means for dividing said strip into pieces while it is so held, and means movable in substantially said plane for moving said pieces from said feeding means and depositing each of said pieces into one of said die cavities.

3. A machine of the character described, comprising a support having a flat surface and a plurality of die cavities therein, means for feeding and temporarily holding a strip of material to be operated upon in the plane of said flat surface, means for dividing said strip into pieces while it is so held, and means movable in substantially said plane for pushing each of said pieces laterally from said feeding means over said flat surface into one of said die cavities.

4. A machine of the character described, comprising a support having a flat surface and a plurality of annular die cavities therein, means for feeding and temporarily holding a strip of material to be operated upon in the plane of said flat surface, means for dividing said strip into pieces, and means for moving said pieces from said feeding means, simultaneously shaping each of said pieces into annular form and depositing each piece into one of said die cavities.

5. A machine of the character described, comprising a support having a flat surface and a plurality of die openings therein each having a central post to form an annular cavity, means for feeding and temporarily holding a strip of material to be operated upon in the plane of said flat surface, means for dividing said strip into pieces, means for pushing each of said pieces laterally from said feeding means over said flat surface against one of said posts, and means for simultaneously wrapping each of said pieces around the respective post into annular form and depositing the piece into the corresponding die cavity.

6. In a machine of the character described, mechanism for supplying material to a predetermined point comprising means for feeding a strip of material, a reciprocating carrier movable between said feeding means and said predetermined point for receiving said strip of material from said feeding means and carrying it to said point upon movement of the carrier in one direction, and means for driving said feeding means and said carrier so that the carrier moves at substantially the same speed as the material from said feeding means.

7. In a machine of the character described, mechanism for supplying material to a predetermined point comprising means for feeding a strip of material, a reciprocating carrier movable between said feeding means and said predetermined point for receiving said strip of material from said feeding means, and carrying it to said point upon movement of the carrier in one direction, means for reciprocating said carrier, and a driving connection between said carrier and said feeding means so that the carrier moves at substantially the same speed as the material from said feeding means.

8. In a machine of the character described, mechanism for supplying material to a predetermined point comprising means for feeding a strip of material, a reciprocating carrier movable between said feeding means and said predetermined point for receiving said strip of material from said feeding means and carrying it to said point upon movement of the carrier in one direction, and means for driving said feeding means and said carrier so that the carrier moves at substantially the same speed as the material from said feeding means as the carrier moves toward said point and said feeding means remains stationary as the carrier moves in the other direction.

9. In a machine of the character described, the combination of means for feeding a strip of material, and means for shaping said strip of material into annular form comprising a plurality of fingers movable relatively to said feeding means and each other to bend said strip into substantially U-shape, and a curling member for successively bending the ends of said strip into abutting relation.

10. In a machine of the character described the combination of a support having a flat surface and a die opening therein having a post projecting therefrom above said surface, means for feeding a strip of material adjacent to said die opening in the plane of said surface, and means for shaping said strip into annular form and depositing it into said die opening comprising a plurality of fingers movable relatively to said feeding means and to each other in said plane, means for actuating said fingers to move said strip from said feeding means into a position against said post and bending said strip about said post into substantially U-shape, and curling means for successively bending the ends of said strip about said port into abutting relation to each other.

11. In a machine of the character described the combination of a support having a flat surface and a die opening therein having a post projecting therefrom above said surface, means for feeding a strip of material adjacent to said die opening in the plane of said surface, and means for shaping said strip into annular form and depositing it into said die opening comprising a plurality of fingers movable relatively to said feeding means and to each other in said plane, means for actuating said fingers to move said strip from said feeding means into a position adjacent said post and bending said strip about said post into substantially U-shape, and curling means movable parallel to said plane transversely of the ends of said strip for bending said ends about said post into abutting relation to each other.

12. In a machine of the character described the combination of a support having a flat surface and a die opening therein having a post projecting therefrom above said surface, means for feeding a strip of material adjacent to said die opening in the plane of said surface, and means for shaping said strip into annular form and depositing it into said die opening comprising a plurality of fingers movable relatively to said feeding means and to each other in said plane, one of said fingers being arranged radially to said post and one of the other fingers being arranged to pass said post at each of diametrically opposite points, means for actuating said fingers to push said strip from said feeding means so that the first-mentioned finger holds the strip against said post and the other two fingers bend the strip into substantially U-shape, and curling means for successively bending the ends of said strip about said post into abutting relation to each other.

ESECK C. MILLER.